United States Patent [19]
Warden et al.

[11] Patent Number: 5,346,570
[45] Date of Patent: Sep. 13, 1994

[54] CRYOGENIC DEWAR AND METHOD OF FABRICATION

[75] Inventors: Laurence Warden; Keith Esser, both of San Diego, Calif.

[73] Assignee: Biomagnetic Technologies, Inc., San Diego, Calif.

[21] Appl. No.: 922,677

[22] Filed: Jul. 30, 1992

[51] Int. Cl.$^5$ .............................. B31C 3/00
[52] U.S. Cl. ........................ 156/191; 156/171; 156/173; 156/175; 156/245; 220/414
[58] Field of Search ............. 220/3, 414; 156/189, 156/190, 191, 192, 171, 173, 175, 245, 293, 294

[56] References Cited

U.S. PATENT DOCUMENTS

| | | | |
|---|---|---|---|
| H1,088 | 8/1992 | Marks | 156/293 X |
| 2,739,917 | 3/1956 | Schulze | 156/294 X |
| 3,372,075 | 3/1968 | Holt | 156/192 X |
| 3,392,865 | 7/1968 | Dryden | 220/414 |
| 3,508,677 | 4/1970 | Laibson | 220/414 X |
| 3,604,587 | 9/1971 | Pechacek | 220/3 |
| 4,056,876 | 11/1977 | Lämmermann | 156/293 X |
| 4,108,700 | 8/1978 | Clodfecter | 156/191 X |
| 4,519,859 | 5/1985 | Roth | 156/294 X |
| 4,602,722 | 7/1986 | Ives | 220/414 |
| 4,773,952 | 9/1988 | Wesley, Jr. | 156/156 |
| 4,896,904 | 1/1990 | Gadsden | 156/86 |
| 4,906,313 | 3/1990 | Hill | 156/294 |
| 4,931,119 | 6/1990 | Watkins | 156/173 |
| 4,993,040 | 6/1990 | Wesley, Jr. | 156/245 X |
| 5,000,342 | 3/1991 | Sharp | 156/293 X |
| 5,154,792 | 10/1992 | Patterson | 156/293 X |

FOREIGN PATENT DOCUMENTS 0228683 7/1987 European Pat. Off. .
0272793 6/1988 European Pat. Off. .

OTHER PUBLICATIONS

W. R. Abel et al., "Thermal and Magnetic Properties of Liquid He$^3$ at Low Pressure and at Very Low Temperatures", *Physics*, vol. 1, No. 6, pp. 337–387 (1965).

*Primary Examiner*—David A. Simmons
*Assistant Examiner*—C. Rainwater
*Attorney, Agent, or Firm*—Gregory Garmong

[57] ABSTRACT

A dewar includes an inner dewar and a dewar thermal shield. The dewar thermal shield has a thermal shield body formed of a layer of radiative insulation, an inner layer of fiberglass cloth overlying the layer of radiative insulation, a metallic screen overlying the inner layer, and an outer layer of fiberglass cloth overlying the metallic screen. The dewar thermal shield also has a thermal shield tail cap attached to the thermal shield body. The tail cap is formed of a layer of radiative insulation, a layer of fiberglass cloth overlying the layer of radiative insulation, a layer of thermal foil overlying the layer of fiberglass cloth, the thermal foil being formed of thermal conductors embedded in a film adhesive matrix with the thermal conductors extending to the body, and a top layer of fiberglass cloth overlying the layer of thermal foil.

13 Claims, 5 Drawing Sheets

CRYOGENIC DEWAR AND METHOD OF FABRICATION

BACKGROUND OF THE INVENTION

This invention relates to dewars, and, more particularly, to dewars used in measurement of small magnetic fields.

Biomagnetometers are devices that measure the small magnetic fields produced by a living organism. The biomagnetometer includes a number of sensors arranged in an array external to the organism, which measure the magnetic field at a number of locations. Each sensor has a magnetic field pickup coil. When a small magnetic flux change penetrates the pickup coil, a small electrical current flows in the coil. This small current is detected by a sensitive detector of electrical currents, preferably a Superconducting QUantum Interference Device, sometimes known by the acronym "SQUID". The output of the various SQUIDs, after signal conditioning and filtering, is provided to a computer which stores and analyzes the data.

The SQUIDs operate only at superconducting temperatures, and to attain the best system performance the pickup coils and SQUIDs are usually placed into a cryogenically cooled vessel termed a dewar. The dewar contains a reservoir of a cryogenic fluid such as liquid helium, with the sensors and SQUIDs in a structure termed a "dewar tail" that extends downwardly from the reservoir. A thermal shield surrounds the dewar and is supported from the neck at the upper end of the dewar. The thermal shield aids in maintaining the low temperature of the sensors and SOUIDs by intercepting radiant heat that flows inwardly through an outer dewar body and outer insulation. The heat received by the thermal shield is conducted upwardly through the thermal shield to the point of its attachment at the dewar neck, where the heat is transferred to the cryogenic gas that evaporates from the reservoir. The entire structure must be nonmagnetic in order to avoid interfering with the operation of the pickup coils and SOUIDs.

The construction of the thermal shield is a principal focus of the present invention. The thermal shield has conventionally been made from layers of radiative insulation, fiberglass, and coil foil. Coil foil is itself a material of layered construction with a fiberglass cloth support and parallel heat-conducting elements such as copper wires embedded in a film adhesive such as an epoxy. The coil foil is arranged in the thermal shield so that the copper wires extend from the dewar tail upwardly toward the neck of the reservoir that contains the cryogenic fluid. The copper wires conduct the heat received by the thermal shield to the dewar neck for transfer to the evaporated cryogenic fluid.

One problem that has been experienced in the construction of dewars of this type is the difficulty in fabricating the heat shield to the required dimensions, curvatures, and dimensional stability over the broad temperature range experienced by the thermal shield structure. When curvatures are small, it is difficult to form the heat shield in the first place, and there is a tendency for the heat shield to deform and crack in service. Such irregularities in the final heat shield can have a significant adverse effect on the performance of the biomagnetometer. It was sometimes possible to manufacture acceptable dewars of some designs with the prior approach, but success was often dependent upon the skill of the manufacturing personnel.

There is a need for an improved construction for dewars used in magnetometry applications, to permit designers more latitude in selection of the structural designs. Such improved dewars must have good thermal characteristics, and should also be readily fabricated without failures in service. The present invention fulfills this need, and further provides related advantages.

SUMMARY OF THE INVENTION

The present invention provides a dewar and a method for its fabrication. The dewar is nonmagnetic, and has excellent thermal shielding characteristics. The dewar may be constructed with intricate shapes and small diameter curvatures in the heat shield, without resulting in cracking or other failures during construction or later during service. The manufacture of the dewar is highly reproducible, and is much less dependent upon the skill level of the manufacturing personnel than were prior designs.

In accordance with the invention, a dewar includes a dewar thermal shield, and, typically, an inner dewar and an outer dewar. The dewar thermal shield comprises a thermal shield body, which includes a layer of radiative insulation, an inner layer of fiberglass cloth overlying the layer of radiative insulation, a unidirectional metallic screen overlying the inner layer, and an outer layer of fiberglass cloth overlying the metallic screen. The thermal shield further comprises a thermal shield tail cap attached to the thermal shield body. The tail cap includes a layer of radiative insulation, a layer of fiberglass cloth over the radiative insulation, a layer of thermal foil overlying the layer of fiberglass cloth, the thermal foil being formed of thermal conductors embedded in a film adhesive matrix with the thermal conductors extending to the body, and a top layer of fiberglass cloth overlying the layer of thermal foil.

The invention also extends to the method of fabricating the dewar. In accordance with this aspect of the invention, a method for preparing a dewar includes preparing a thermal shield tail cap. The preparation of the tail cap includes furnishing a tail cap mandrel, applying a layer of radiative insulation over the mandrel, applying a layer of fiberglass cloth over the radiative insulation, applying a layer of thermal foil over the layer of fiberglass cloth, the thermal foil being formed of thermal conductors embedded in a B-staged film adhesive matrix, applying a layer of fiberglass cloth overlying the layer of thermal foil, consolidating the layer of radiative insulation, layer of thermal foil and layer of fiberglass cloth, and curing the B-staged film adhesive.

The use of a thermal foil having thermal conductors embedded in a B-staged film adhesive matrix is a key feature of the invention. In the past, it has been conventional to apply coil foil material to mandrel forms using a wet layup approach in which a liquid resin adhesive was applied in order to retain the coil foil and other layers in place on the form. The process was messy and led to manufacturing variations. That is, there could be variations in structure and thickness within any single dewar structure, and no two dewars were identical. Heat flow characteristics could therefore vary between different regions of a single dewar, and as between different dewars that were nominally constructed to be identical.

By contrast, in the present approach the thermal foil is prepared as an array of heat conductors embedded in a B-staged film adhesive such as an epoxy. The B-staged film adhesive is a curable adhesive material that is partially ("B-stage") cured so that it is sufficiently solid to hold its shape but not in a fully cured state that is hard and cannot be formed to a desired shape. The thermal foil prepared in this manner is applied to a mandrel over a radiative insulation layer and a glass cloth layer and held in place with adhesive tape. The thermal foil and other layers are thus furnished in a pre-manufactured, regular form. They can be cut to shape and size with patterns and templates, producing standardized "parts" for use in manufacturing. The pieces are placed onto the mandrel and moved and repositioned if necessary.

The fabrication of the thermal shield further involves preparing a thermal shield body by furnishing a body mandrel, applying a layer of radiative insulation overlying the body mandrel, applying an inner layer of fiberglass cloth overlying the layer of radiative insulation, applying a unidirectional metallic screen overlying the inner layer, and applying an outer layer of fiberglass cloth overlying the metallic screen. The thermal shield cap is joined to the thermal shield body, preferably by interleaving layers of material from the two structures. A reinforcing annulus made of fiberglass may be used to strengthen the joint. Fabrication is completed by consolidating the joined thermal shield cap and thermal shield body, to form a free-standing dewar heat shield.

The dewar heat shield is joined to the neck of the separately fabricated inner dewar. The joining is preferably accomplished with an aluminum flange attached to the neck of the inner dewar and to the upper end of the heat shield. Finally, the outer dewar housing is joined to this assembly.

The present approach provides a dewar construction that is strong, has the required thermal properties, and is reproducibly fabricated. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
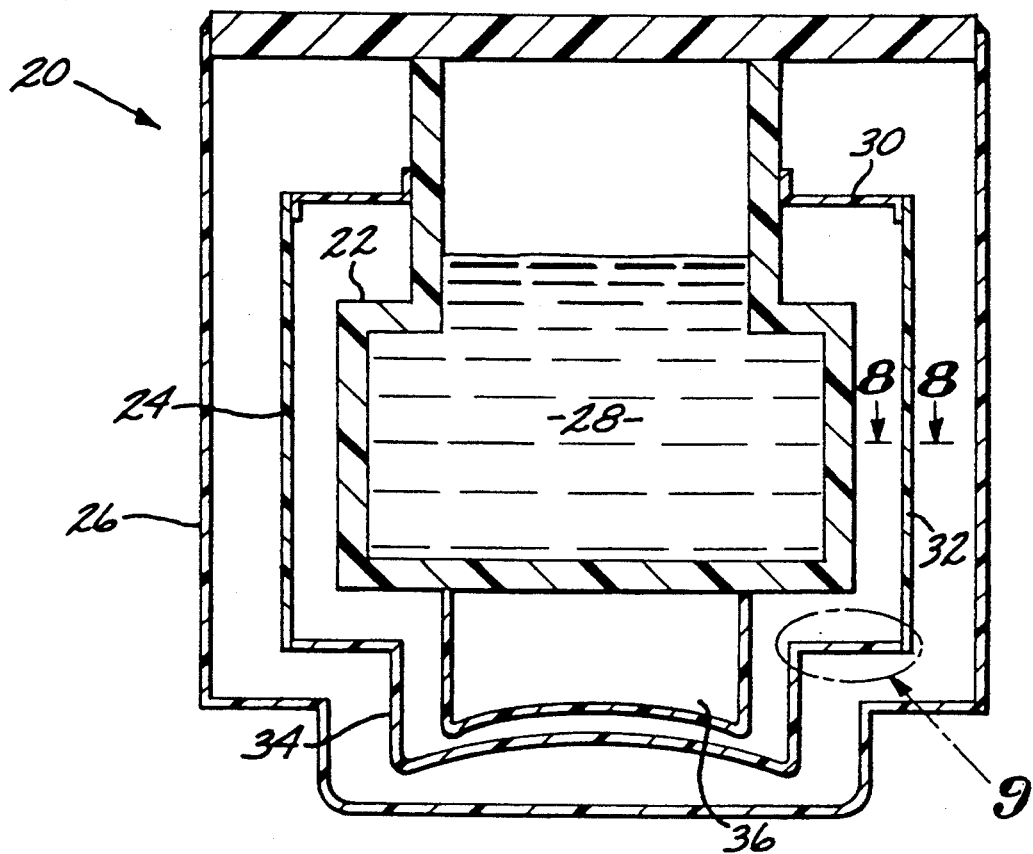
FIG. 1 is a sectional view of a dewar made in accordance with the invention.

FIG. 1 illustrates a dewar 20 according to the present invention, in sectional view. The dewar 20, which is cylindrically symmetric in configuration, includes an inner dewar 22, a thermal shield 24, and an outer dewar 26. The inner dewar 22 contains a cryogenic liquefied gas 28, and is formed of fiberglass. A preferred approach to construction of the inner dewar 22 is set forth in U.S. Pat. No. 4,773,952, which is incorporated by reference. However, any fiberglass or equivalent construction may be used. The outer dewar 26 is also constructed of fiberglass in the desired shape and size.

The thermal shield 24 is fabricated as a free-standing unit, and is joined to the inner dewar 22 by adhesive bonding through an aluminum alloy flange 30. The thermal shield 24 is fabricated as two parts, a thermal shield body 32 and a thermal shield tail cap 34. These parts 32 and 34 are fabricated and joined together during the manufacturing process.

Figure 3:
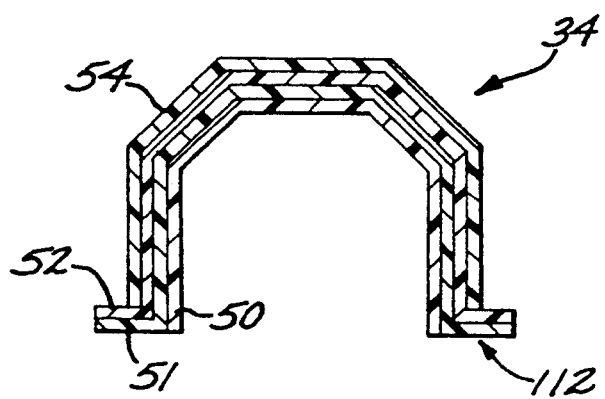
FIG. 3 is an enlarged detail sectional view of the thermal shield tail cap of FIG. 1.
Figure 2:
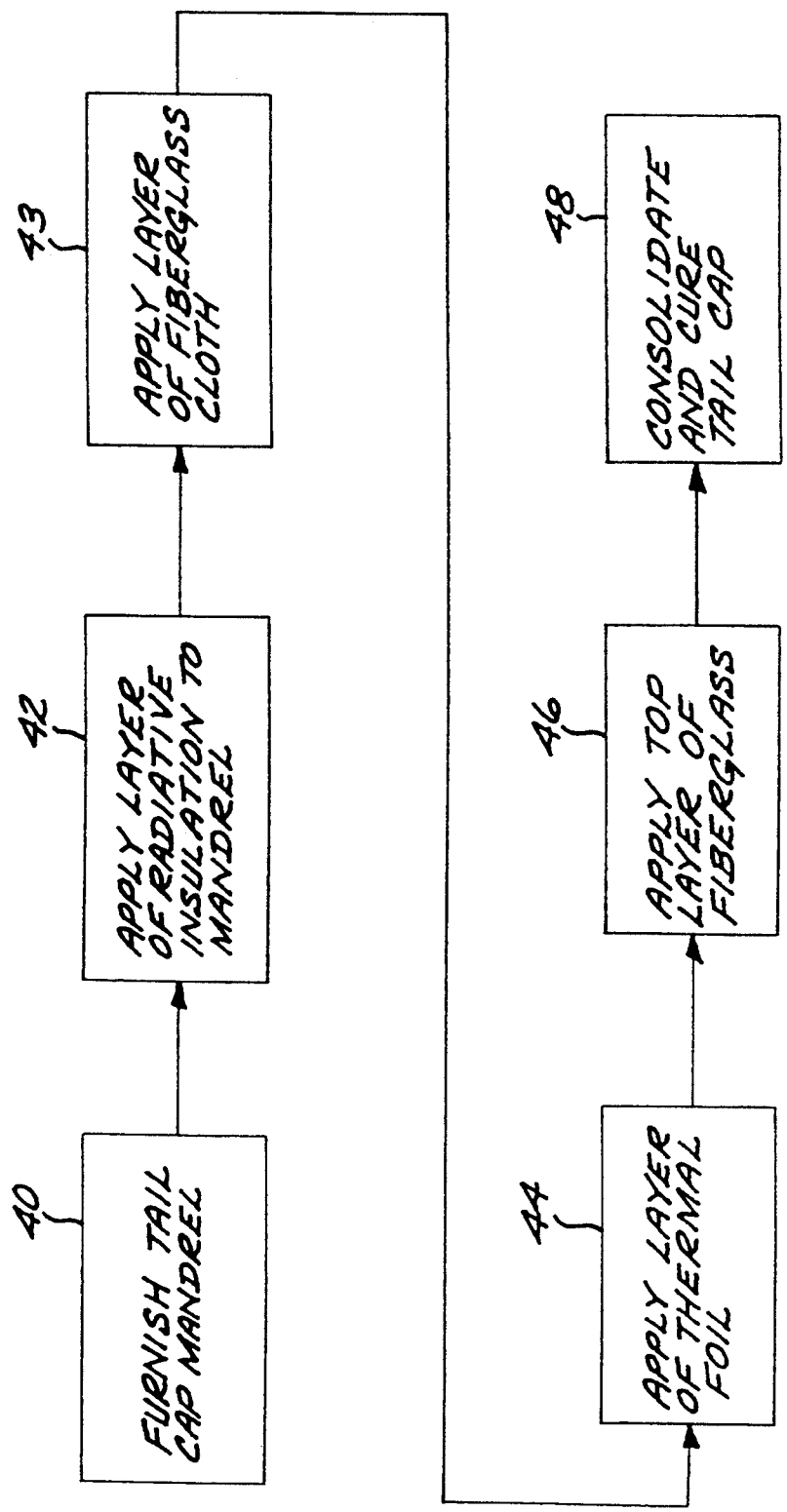
FIG. 2 is a flow diagram for the preparation of the thermal shield tail cap.

The method of preparation of the thermal shield tail cap 34 is illustrated in FIG. 2, and its structure is shown in FIG. 3. The tail cap 34 covers the dewar tail region 36, and has a smaller cylindrical diameter than does the thermal shield body 92. A mandrel (not shown) having the required size and diameter of the dewar tail 36 is furnished, numeral 40. A layer 50 of a radiative insulation is applied over the mandrel, numeral 42. The radiative insulation, known as "superinsulation", is preferably an aluminized polymeric material such as mylar, about 0.001 inches thick.

Figure 4:
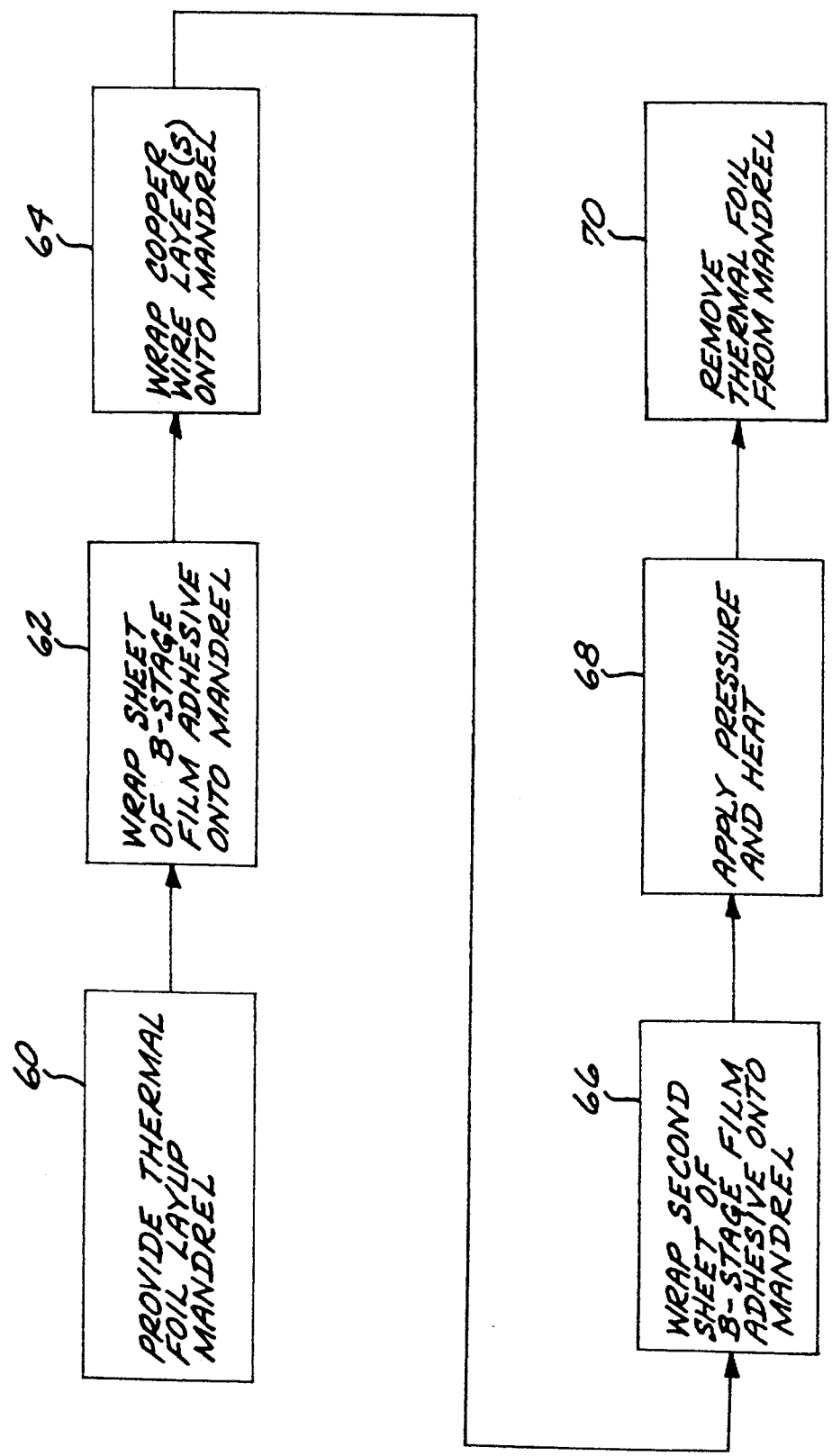
FIG. 4 is a flow diagram for the preparation of the thermal foil material.
Figure 5:
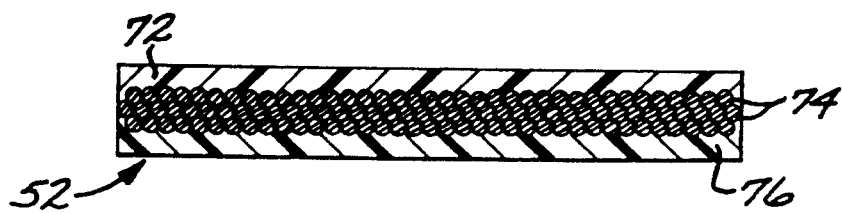
FIG. 5 is a sectional view of the thermal foil material.

A layer 51 of fiberglass cloth (sometimes termed "fiberglass reinforcement" in the art) is applied over the radiative insulation 50, numeral 43. Next, a layer 52 of thermal foil is applied over the layer 51 of fiberglass cloth, numeral 44. The thermal foil 52 is not known commercially. Preparation of the thermal foil 52 is illustrated in FIG. 4, and its structure is illustrated in detail in FIG. 5. The thermal foil 52 is prepared as a separate article by furnishing a thermal foil preparation mandrel (not shown), numeral 60 of FIG. 4. (This mandrel is not the same as the mandrels upon which the thermal shield body 32 or tail cap 34 are prepared.) A first sheet 72 of a B-staged film adhesive, preferably an epoxy such as Newport NB101, is applied to the mandrel, numeral 62. The film adhesive sheet 72 is a partially cured film adhesive, which is tacky to the touch but quite pliable. At least one layer, and preferably several layers 74, of thermal conductors such as small copper wires, are wrapped onto the mandrel over the adhesive sheet 72, numeral 64. Although there is a slight pitch between the adjacent turns of thermal conductor, for practical purposes the conductors are substantially parallel. A second sheet 76 of the B-staged film adhesive is wrapped over the thermal conductors 74 on the mandrel, numeral 66. To partially consolidate the resulting structure on the mandrel, a layer of shrink wrap plastic is applied over the second sheet 76, and gently heated with a heat gun, numeral 68. The heating causes the shrink wrap plastic to shrink, so that the B-staged film adhesive in the sheets 72 and 76 flows into the interstices between the thermal conductors in the layer 74. The result is a consolidated, but as-yet not fully cured, thermal foil 52. The thermal foil 52 is removed from the mandrel, and is ready for use in fabricating the thermal shield tail cap 34.

Figure 6:
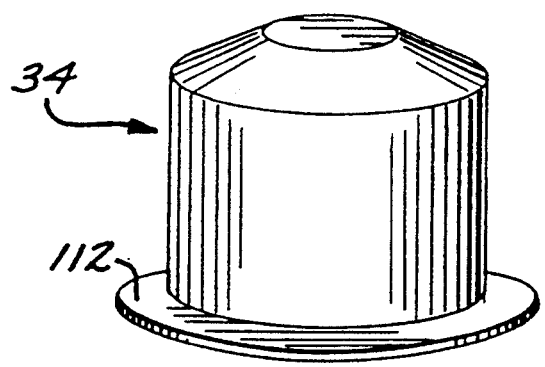
FIG. 6 is a perspective view of the finished thermal shield tail cap.

Returning to FIG. 3, the thermal foil 52 is applied to the tail cap mandrel in the required pattern, numeral 44. Because the thermal foil 52 incorporates a film adhesive 72, 76 that is not fully cured, and has no cured components, it may be readily cut into patterns that can be arranged onto a complex mandrel shape having small radii bends. In the case of the final thermal shield tail cap 34 shown in FIG. 6, the structure has a top-hat shape with a small radius bend at the brim of the hat section. There is a disc-shaped region at the top of the hat section. Prior experience demonstrated that it was very difficult to fabricate such sections with conventional coil foil due to the rigidity of the coil foil and consequent cracking when small-radius bends were formed. By contrast, the present thermal foil 52 can readily be bent to such shapes, without cracking during fabrication or during service.

After the layer of thermal foil 52 is applied, a layer of fiberglass cloth 54 is applied overlying the layer of thermal foil 52, numeral 46 of FIG. 2. As with the layer of thermal foil 52, the layer of fiberglass cloth 54 is patterned and cut as necessary to form it to the shape of the mandrel, to produce the final shape such as that shown in FIG. 6. In the particular dewar tail cap 34 of FIG. 6, the radiative insulation layer 50 and the fiberglass cloth layer 54 are applied onto the sides and the top of the hat, and not to a brim area 112. The fiberglass cloth layer 51 and the thermal foil layer 52 are applied onto the sides and the top of the hat, and to the brim area as well. However, the coverage of individual layers may be varied as required in specific designs.

The layers 50, 51, 52, and 54 are consolidated, and, in the case of the layers 51, 52, and 54, fully cured, numeral 48, preferably with a vacuum bag and heating process. A bladder is placed over the layered structure on the mandrel, and a vacuum bag is placed over the bladder. The vacuum bag is pressurized to one atmosphere pressure. The mandrel, layers 50, 51, 52, and 54 on the mandrel, bladder, and vacuum bag are placed into an oven at an appropriate temperature, about 225 F. in the case of the indicated film adhesive and fiberglass, and held at temperature for about 2 hours. After cooling, the mandrel is removed, and the finished tail cap 94 is set aside for subsequent use.

Figure 8:
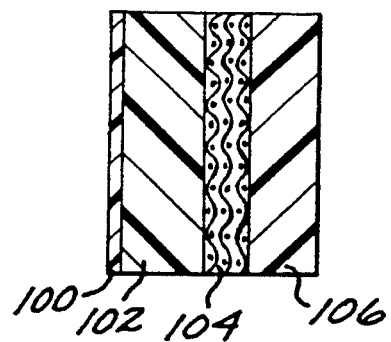
FIG. 8 is an enlarged sectional view of the thermal shield body taken generally along line 8—8 of FIG. 1.
Figure 9:
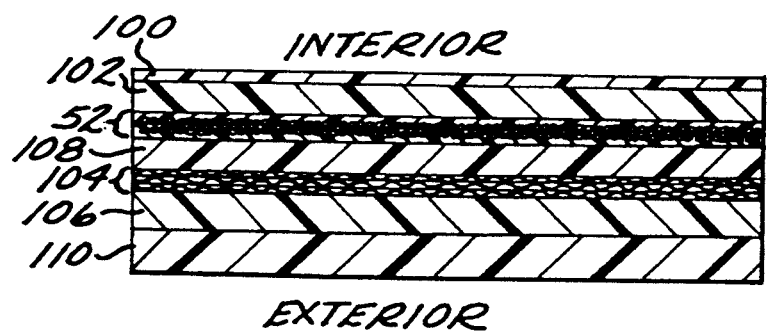
FIG. 9 is an enlarged detail of the joint between the thermal shield body and the thermal shield tail cap taken generally in the region 9 of FIG. 1.
Figure 7:
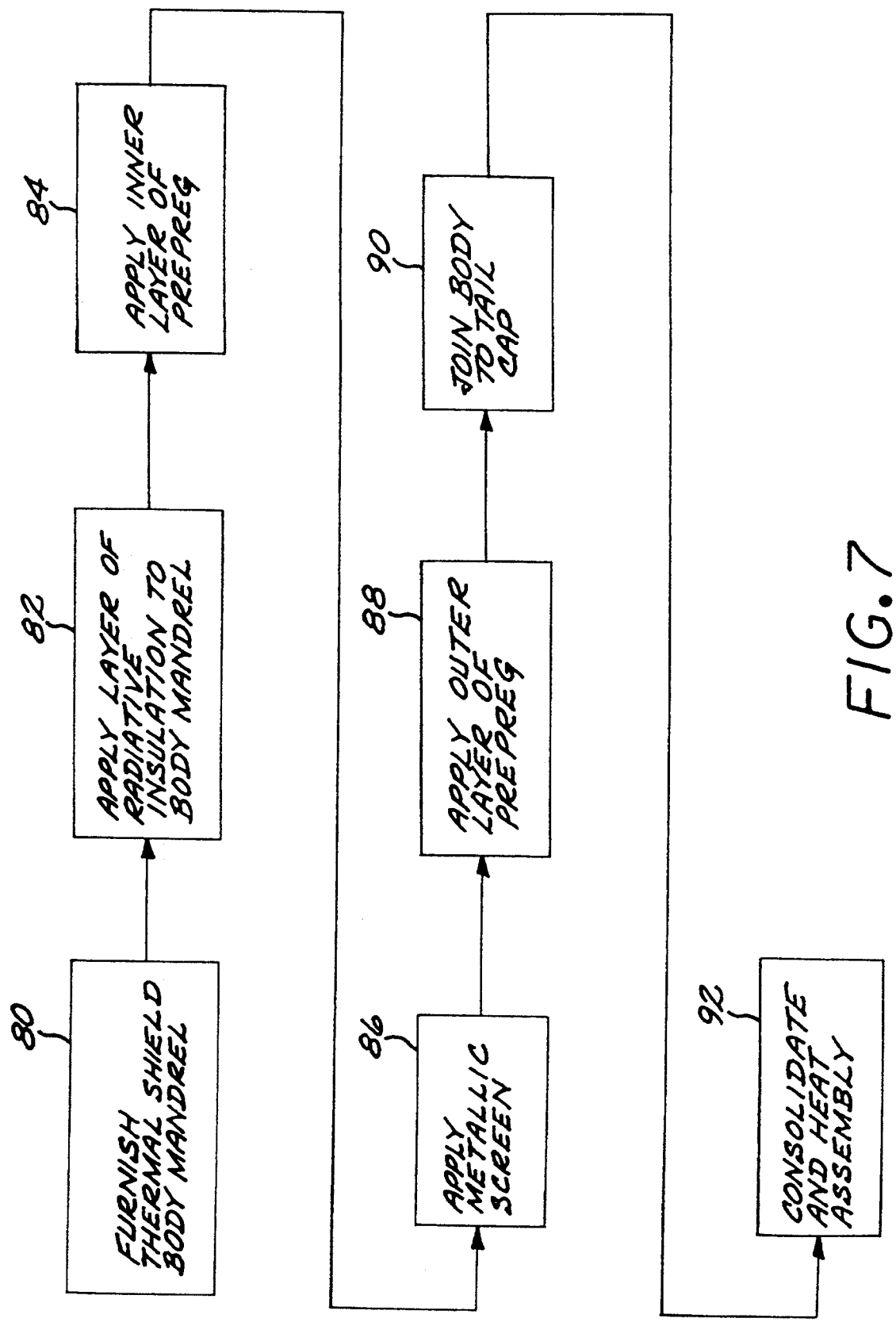
FIG. 7 is a flow diagram for the preparation of the thermal shield body and the joining of the tail cap to the body.

In a separate operation, the thermal shield body 32 is prepared, and the thermal shield top cap 34 is joined to the body 32. FIG. 7 depicts the procedure for preparing the thermal shield body 32 and joining it to the top cap 34. FIG. 8 illustrates the structure of the thermal shield body 32, and FIG. 9 shows the structure of the joint between the top cap 34 and the body 32.

Referring to FIG. 7, a thermal shield body mandrel (not shown) is furnished, numeral 80. The body mandrel is preferably cylindrical with a cylindrical diameter greater than that of the thermal shield top cap mandrel. A layer of radiative insulation 100 is applied to the body mandrel, numeral 82. The radiative insulation 100 is preferably the same material as the radiative insulation 50. An inner layer 102 of prepreg is then laid onto the body mandrel over the radiative insulation layer 100, numeral 84. A unidirectional metallic screen 104 is applied over the inner layer of prepreg 102, numeral 86. The unidirectional metallic screen 104 is similar to conventional screening material, but has metallic wires extending only parallel to the cylindrical axis of the body mandrel. (The cross-woven fibers are a nonmetallic material.) These wires of the screen 104 conduct heat upwardly when the dewar operates, and also serve to screen the interior of the dewar against external electromagnetic signals. An outer layer 106 of prepreg is applied overlying the screen 104, numeral 88.

As part of this process, the body 32 is joined to the tail cap 34, numeral 90. To ensure good strength of the final thermal shield 24, the joining is accomplished utilizing the layered structure of the body 32 and the tail cap 34. In the preferred approach, the tail cap 34 includes the brim region 112, and some layers of the body 32 are extended radially inwardly to abut to the brim region 112 in a facing relation to provide a large bonding area, as previously discussed. FIG. 9 illustrates the structure in this region, and its location may be seen by reference to region 9 of FIG. 1.

The joining region 9 has a structure made by interleaving various layers from the tail cap 34 and the body 32. The interleaving is accomplished during the joining step 90. The innermost layer is the radiative layer 100 of the body 32. An inner fiberglass cloth layer 102 lies adjacent to the radiative layer 100. The thermal foil layer 52 of the tail cap 34 is interleaved to lie in contact with the inner fiberglass cloth layer 102. An extra layer 108 of curable film adhesive material is deposited adjacent to the thermal foil layer 52. The unidirectional metallic screen 104, bent inwardly, lies in contact with the extra layer 108 of film adhesive. In the subsequent compacting operation, the layer 108 deforms to intermesh with the screen 104 and bond it securely. The outer fiberglass cloth layer 106 lies over the screen 104. Optionally, an annular plate 110 of prepreg is bonded to the outer fiberglass cloth layer 106 to complete the joint region 9. It will be appreciated that the precise order of the layers in the joint, as well as the selection of layers in the joint, is not critical and may be varied in different structures.

After the body 32 and the top cap 34 are joined in this manner, they are consolidated and heated, numeral 92. An approach similar to that used in step 48 is used, except that no bladder is required for the body 32. Instead, a release film and a breather ply to permit removal of air with a vacuum applied are placed over the assembly of the body 32 and the top cap 34. (The bladder used on the top cap 34 is still used, as it aids in compacting the brim area.) A vacuum bag is placed over the assembly, and a vacuum is applied. The structure is placed into an oven at a temperature sufficient to cure the film adhesive and the fiberglass cloth prepreg. In the preferred case, the assembly is held at a temperature of 260 F. for 2 hours. The oven is turned off, and the part is allowed to furnace cool to ambient temperature. The completed thermal shield 24 is a free-standing part that can be handled in the subsequent final assembly.

The completed thermal shield 24 is joined to the inner dewar 22 using the flange 30, as previously described, and the outer dewar 26 is joined to this assembly.

A dewar 20 of the configuration shown in FIG. 1 has been constructed. By way of illustration of the dimensions possible with this approach, the inner dewar 22 had a length of about 40 inches and a cylindrical diameter of about 16 inches. The thermal shield body 32 had a cylindrical diameter of about 18 inches, and the thermal shield top cap 34 had a cylindrical diameter of about 12 inches. The outer dewar 26 has an overall length of about 22 inches. The thermal characteristics of this dewar were measured and found to be superior to those of similar dewars fabricated using the conventional approach.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for preparing a dewar, comprising the steps of:
 preparing a thermal shield tail cap by
  furnishing a tail cap mandrel,
  applying a layer of radiative insulation over the tail cap mandrel,
  applying a layer of fiberglass cloth over the layer of radiative insulation,
  applying a layer of thermal foil overlying the layer of fiberglass cloth, the thermal foil being formed of thermal conductors embedded in a B-staged film adhesive matrix,
  applying a layer of fiberglass cloth overlying the layer of thermal foil, and
  consolidating the layer of radiative insulation, layer of thermal foil and layer of fiberglass cloth, and partially curing the B-staged film adhesive;
 preparing a thermal shield body by
  furnishing a body mandrel,
  applying a layer of radiative insulation overlying the body mandrel,
  applying an inner layer of fiberglass cloth overlying the layer of radiative insulation,
  applying a metallic screen overlying the inner layer, and
  applying an outer layer of fiberglass cloth overlying the metallic screen;
 joining the thermal shield cap to the thermal shield body; and
 consolidating the joined thermal shield cap and thermal shield body, to form a dewar heat shield.

2. The method of claim 1, wherein the step of joining is accomplished concurrently with the step of preparing a thermal shield body, and the step of joining includes the step of
 interleaving at least some of the layers of the thermal shield tail cap and the thermal shield body.

3. The method of claim 1, wherein the step of joining includes the step of
 reinforcing the joined region with an annular piece.

4. The method of claim 1, including the additional step of
 joining the dewar heat shield to an inner dewar.

5. The method of claim 4, wherein the step of joining the dewar heat shield to an inner dewar includes the step of
 furnishing an inner dewar made of fiberglass.

6. The method of claim 4, including the additional step, after the step of joining the dewar heat shield to an inner dewar, of
 joining an outer dewar to the assembly of the inner dewar and the dewar heat shield.

7. The method of claim 1, wherein the thermal shield tail cap and the thermal shield body are cylindrically symmetric.

8. The method of claim 1, wherein the step of applying a metallic screen includes the step of
 applying a unidirectional metallic screen with metallic wires running parallel to each other.

9. The method of claim 1, wherein the step of applying a layer of thermal foil includes the step of
 supplying metallic thermal conductors arranged substantially parallel to each other.

10. A method for preparing a dewar, comprising the steps of:
 preparing a cylindrically symmetric thermal shield tail cap by
  furnishing a cylindrically symmetric tail cap mandrel,
  applying a layer of radiative insulation over the tail cap mandrel,
  applying a layer of fiberglass cloth over the layer of radiative insulation,
  applying a layer of thermal foil overlying the layer of fiberglass cloth, the thermal foil being formed of metallic thermal conductors embedded in a B-staged film adhesive matrix, the thermal conductors lying parallel to a cylindrical axis of the tail cap mandrel,
  applying a layer of fiberglass cloth overlying the layer of thermal foil, and
  consolidating the layer of radiative insulation, layer of thermal foil and layer of fiberglass cloth, and partially curing the B-staged film adhesive;
 preparing a cylindrically symmetric thermal shield body by
  furnishing a cylindrically symmetric body mandrel,
  applying a layer of radiative insulation overlying the body mandrel,
  applying an inner layer of fiberglass cloth overlying the layer of radiative insulation,
  applying a metallic screen overlying the inner layer, the metallic screen comprising unidirectional metallic wires extending parallel to a cylindrical axis of the body mandrel, and
  applying an outer layer of fiberglass cloth overlying the metallic screen;
 joining the thermal shield cap to the thermal shield body by interleaving layers of the thermal shield body and the thermal shield cap, wherein the step of joining is accomplished concurrently with the step of preparing the thermal shield body; and
 consolidating the joined thermal shield cap and thermal shield body, to form a dewar heat shield.

11. The method of claim 10, wherein the cylindrical diameter of the body mandrel is larger than the cylindrical diameter of the tail cap mandrel, and wherein the step of joining includes the step of
 forming a radially extending interleaved joint between the layers of the thermal shield body and the layers of the thermal shield cap.

12. A method for preparing a dewar, comprising the steps of:
 preparing an unconsolidated thermal shield tail cap having a layer of thermal foil formed to a preselected shape, the thermal foil being formed of thermal conductors embedded in a B-staged film adhesive matrix, and a layer of insulation adjacent to the layer of thermal foil;
 consolidating the thermal shield tail cap;
 preparing a thermal shield body having a layer of a metallic heat conductor, and a second layer of insulation adjacent to the metallic heat conductor;
 joining the thermal shield cap to the thermal shield body; and
 consolidating the joined thermal shield cap and thermal shield body, to form a dewar heat shield.

13. The method of claim 12, wherein the step of joining is accomplished concurrently with the step of preparing a thermal shield body, and the step of joining includes the step of
 interleaving at least some of the layers of the thermal shield tail cap and the thermal shield body.

* * * * *